United States Patent [19]

Yoshimura

[11] Patent Number: 4,682,788

[45] Date of Patent: Jul. 28, 1987

[54] STEERING COLUMN SUPPORT STRUCTURE FOR A VEHICLE STEERING MECHANISM

[75] Inventor: Toshiteru Yoshimura, Hiroshima, Japan

[73] Assignee: Mazda Motor Corporation, Hiroshima, Japan

[21] Appl. No.: 809,753

[22] Filed: Dec. 17, 1985

[30] Foreign Application Priority Data

Dec. 21, 1984 [JP] Japan .................................. 59-270471

[51] Int. Cl.⁴ .............................................. B62D 1/16
[52] U.S. Cl. .................................................... 280/779
[58] Field of Search .......................... 280/779; 180/90; 296/192, 70; 74/492

[56] References Cited

U.S. PATENT DOCUMENTS

| | | | |
|---|---|---|---|
| 1,230,245 | 6/1917 | Walker | 280/779 |
| 4,355,820 | 10/1982 | Kitagawa et al. | 280/779 |
| 4,362,319 | 12/1982 | Masaki et al. | 280/779 |
| 4,365,826 | 12/1982 | Iriyama | 280/779 |
| 4,432,565 | 2/1984 | Suzuki et al. | 280/779 |

FOREIGN PATENT DOCUMENTS

| | | | |
|---|---|---|---|
| 57-4467 | 1/1982 | Japan . | |
| 57-39870 | 8/1982 | Japan . | |
| 0194663 | 11/1983 | Japan | 280/779 |
| 59-75360 | 5/1984 | Japan . | |
| 60-31960 | 9/1985 | Japan . | |

Primary Examiner—Richard A. Bertsch
Attorney, Agent, or Firm—Fleit, Jacobson, Cohn & Price

[57] ABSTRACT

A vehicle steering column support structure including a first support member made of a steel pipe. The first support member is from a substantially L-shaped configuration and has a first portion extending along the cowl inner panel and a second portion extending downward from a first portion. The first portion is connected at the end with the cowl side panel and the second portion is connected to the floor panel. A second support member made of a steel pipe is further provided and has a first portion extending along the first portion from the first support member, and a second portion extending forward from the first portion. The first portion of the second support member is connected with the cowl side panel and the second portion is connected with the cowl inner panel. The steering column is supported through a bracket by the first and second support member and the cowl inner panel.

9 Claims, 8 Drawing Figures

STEERING COLUMN SUPPORT STRUCTURE FOR A VEHICLE STEERING MECHANISM

BACKGROUND OF THE INVENTION

1. Field of the Invention

The present invention relates to a vehicle steering mechanism and more particularly to a steering column support structure for a vehicle steering mechanism.

2. Description of the Prior Art

In a vehicle having a body which includes cowl side panels extending forwardly from the door hinge pillars and a cowl inner panel extending transversely between the cowl side panels, it has been a common practice to install a bracket on the cowl inner panel for supporting a steering column assembly. The conventional structure is, however, disadvantageous in that the cowl inner panel cannot provide a satisfactorily rigid support for the steering column assembly, so that vibrations are produced in the steering column assembly under high speed operation or rough road operation. In view of the problems, a proposal has been made by the Japanese utility model application No. 55-115948 filed on Aug. 18, 1980, and disclosed for public inspection on Mar. 3, 1982, under the disclosure No. 57-39870, to provide a tubular member extending between and secured to the cowl side panels, and to support the column support bracket by the cowl inner panel and the tubular member. The structure proposed by the Japanese utility model can therefore provide an, increased rigidity in supporting the steering column assembly to a certain extent. It has, however, been found that the structure is insufficient to decrease or eliminate vibrations of the steering column assembly in the vertical direction.

Japanese utility model application No. 57-171275, filed on Nov. 12, 1982, and disclosed for public inspection on May 22, 1984, under the disclosure No. 59-75360, discloses a steering column support structure having a transversely extending support pipe which is bifurcated at the portion where it supports the steering column. Even in this structure, satisfactory rigidity cannot be obtained.

SUMMARY OF THE INVENTION

It is therefore an object of the present invention to provide a steering column supporting structure in which vertical vibrations can be suppressed.

Another object of the present invention is to provide a steering column support structure which can support the vehicle steering column assembly with satisfactory rigidity in any direction.

According to the present invention, the above and other objects can be accomplished by a vehicle steering column support structure including cowl side panels extending at the opposite sides of a vehicle body forwardly from door hinge pillars, a cowl inner panel extending transversely and having opposite ends secured to the cowl side panels, respectively, a first support member having a first portion connected at one end with one of the cowl side panels and extending along said cowl inner panel, and a second portion extending downward from the other end of the first portion and having a lower end secured to a floor panel of the vehicle body, a second support member having a first portion secured at one end to said one cowl side panel, and extending along said cowl inner panel and a second portion extending forward from the other end of the first portion of the second support member and having a forward end secured to the cowl inner panel, and means for supporting a steering column assembly by said first portions of the first and second support members. Preferably, the first and second support members are made from a steel pipe.

According to the features of the present invention, the first support member provides rigid supports in vertical and transverse directions. The second support member functions to distribute vibrations to the cowl side panels and the floor panel. Thus, it is possible to increase the rigidity in the longitudinal direction of the steering column support structure.

The above and other objects and features of the present invention will become apparent from the following description of a preferred embodiment taking reference to the accompanying drawings.

DESCRIPTION OF THE PREFERRED EMBODIMENT

Figure 1:
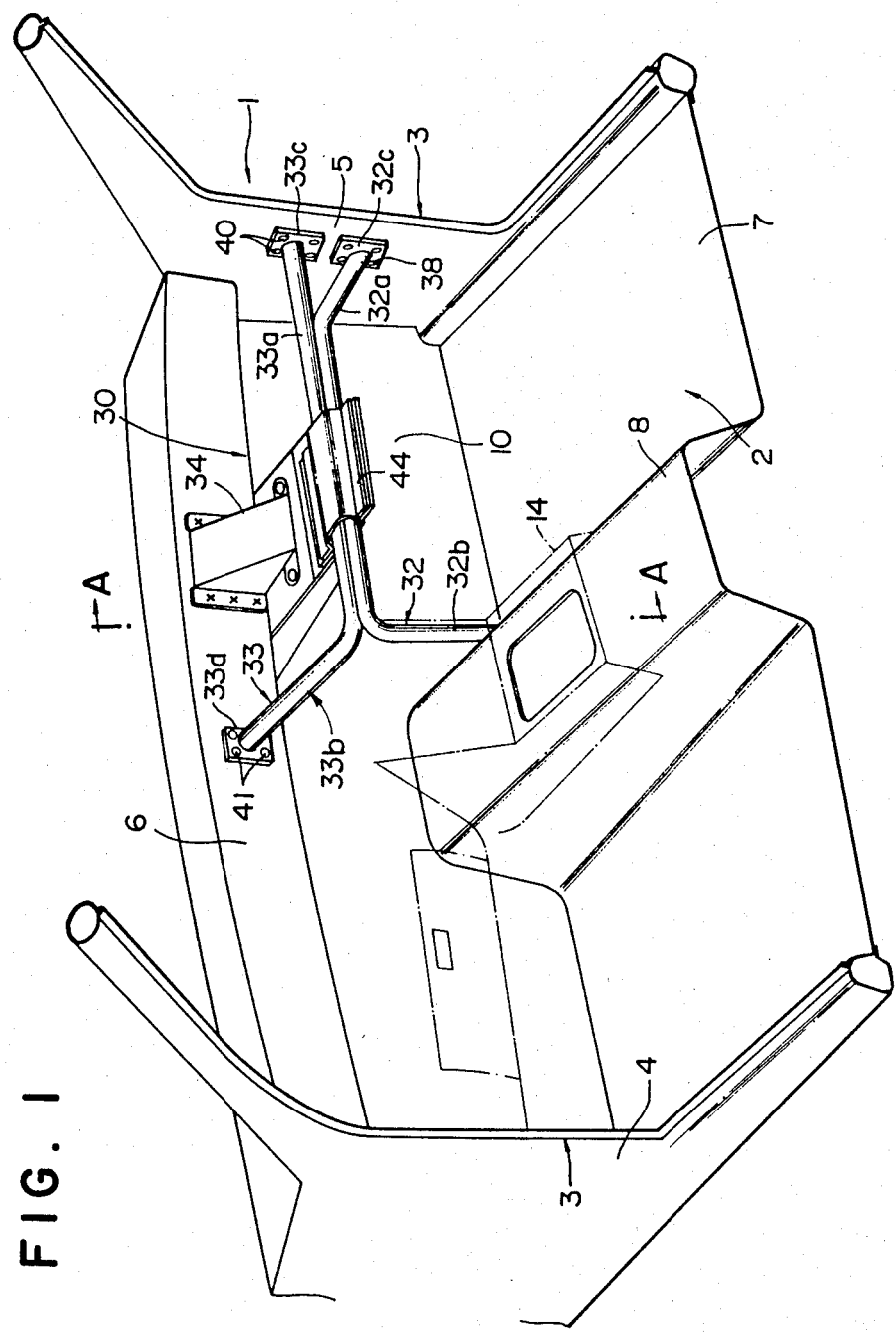
FIG. 1 is a perspective view of a steering column support structure in accordance with one embodiment of the present invention.
Figure 2:
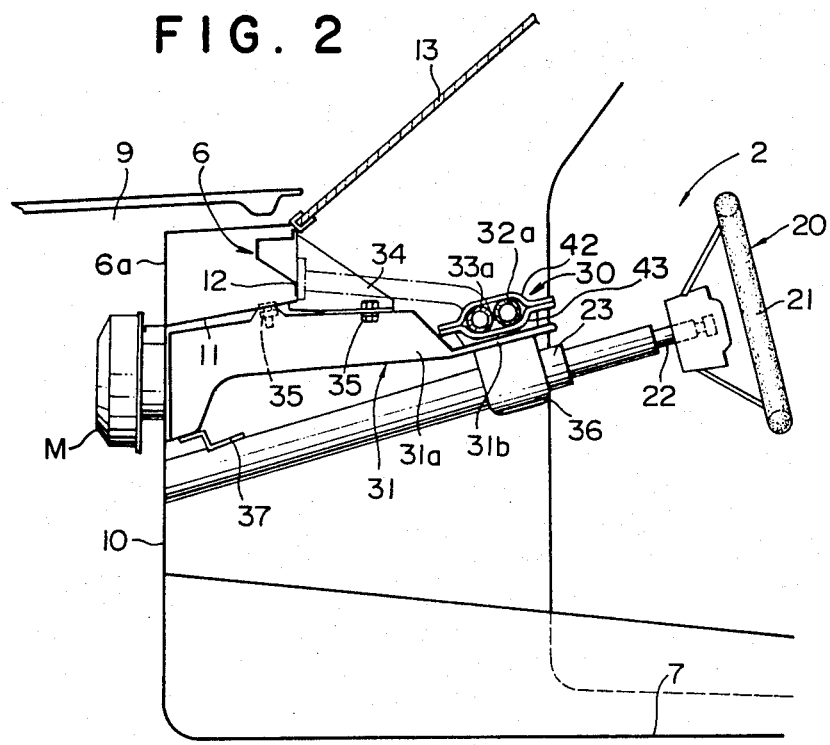
FIG. 2 is a longituding sectional view of the support structure taken along the line A—A in FIG. 1.
Figure 3:
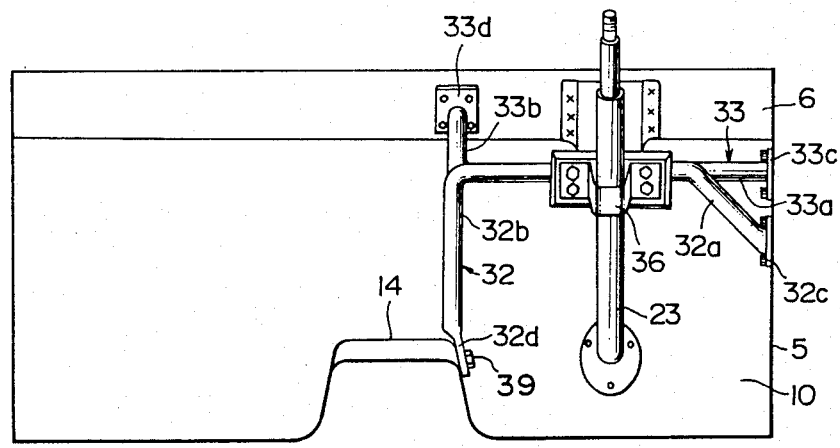
FIG. 3 is a rear view of the support structure.
Figure 4:
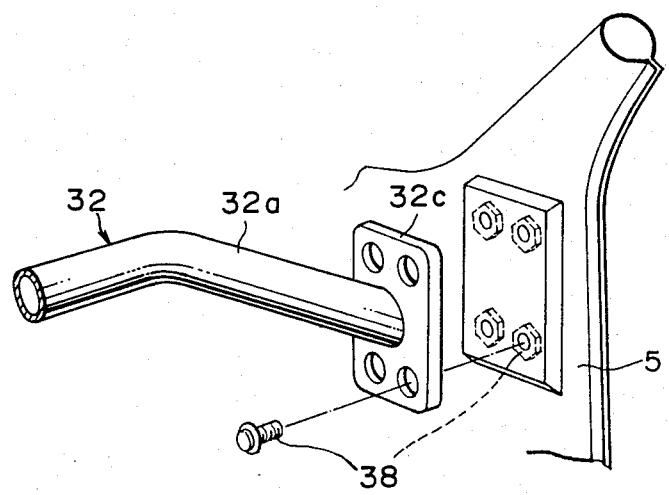
FIG. 4 is a fragmentary perspective view showing the installation of the first support pipe to the cowl side panel.

Referring to the drawings, particularly to FIGS. 1 through 3, there is shown a vehicle front body 1 formed with a driver's compartment 2. The body 1 furher has a door opening defined at each side partially by a door hinge pillar 3. Cowl side panels 4 and 5 are provided to extend forward from the hinge pillars 3, and a cowl inner panel 6 extends transversely between the cowl side panels 4 and 5 and is welded at the opposite ends to these cowl side panels. The body 1 further has a floor panel 7 which is formed with a tunnel section 8 of an inverted, channel-shaped cross-section. In front of the driver's compartment 2, there is an engine compartment 9 defined by a dash panel 10 extending downward from the cowl inner panel 6 to the floor panel 7.

Referring to FIG. 2, it will be noted that the cowl inner panel 6 has a lower wall 11 which is substantially parallel with the floor panel 7, and a transverse wall 12 which is substantially perpendicular to the lower wall 11. The lower wall 11 of the cowl inner panel 6 is secured to the upper end of the dash panel 10. The cowl inner panel 6 is welded to a cowl upper panel 6a to form a structure of closed cross-section which supports a front windshield glass 13.

In the driver's compartment 2, there is a steering mechanism 20 supported by a steering support structure 30. The steering mechanism 20 includes a steering wheel 21, a steering shaft 22 secured at one end to the steering wheel 21 and a hollow steering column 23 encircling the steering shaft 22. The steering support structure 30 includes a master cylinder bracket 31, a first support member 32 and a second support member 33. The master cylinder bracket 31 has a body portion 31a which is secured by means of bolts 35 to the lower wall 11 of the cowl inner panel and to a bracket 34 carried by the transverse wall 12 of the cowl inner panel 6. The bracket 31 carries a brake master cylinder M, and the body portion 31a of the bracket 31 is formed with a rearwardly extending support arm 31b which carries a fitting 36 for attaching the steering column 23 to the bracket 31. A bracket 37 is further provided to connect the steering column 23 to the bracket 31 in the vicinity of the dash panel 10.

Figure 5:
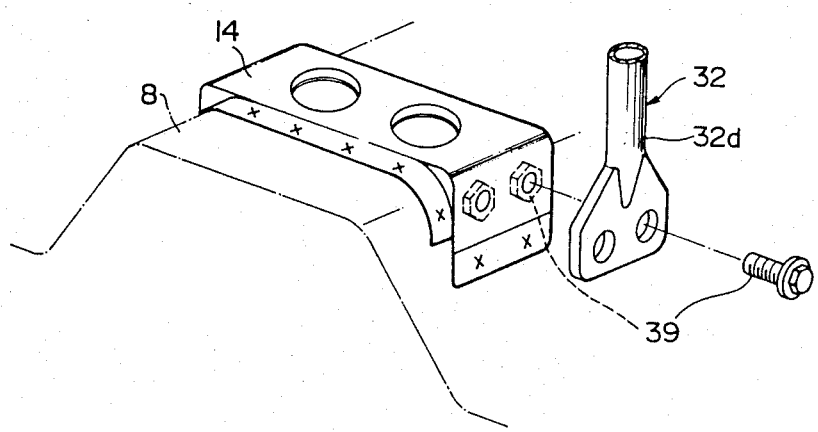
FIG. 5 is a fragmentary perspective view showing the installation of the first support pipe to the floor panel.

The first support member 32 is made from a steel pipe which is bent into a substantially L-shaped configuration. The member 32 has a first portion 32a which is bent obliquely at one end portion and formed at the extreme end with an attachment flange 32c. The flange 32c is connected with the cowl side panel 5 by means of bolts 38. The other end of the first portion 32a is continuous with a second portion 32b which extends substantially vertically downward. The second portion 32b is formed at the lower end with an attachment flange 32d which is secured to the tunnel section 8 by means of bolts 39 as shown in FIGS. 3 and 5. The first portion 32a of the first support member 32 extends along the cowl inner panel 6. In other words, a is of the first portion 32a of the first support member 32 extends substantially parallel with the cowl inner panel 6.

Figure 8:
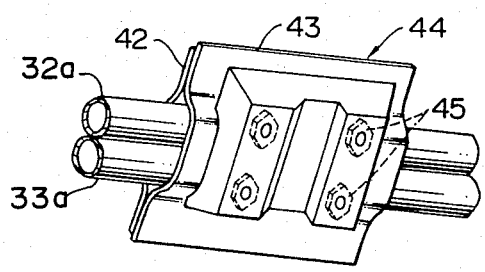
FIG. 8 shows the bottom of the column support bracket.
Figure 6:
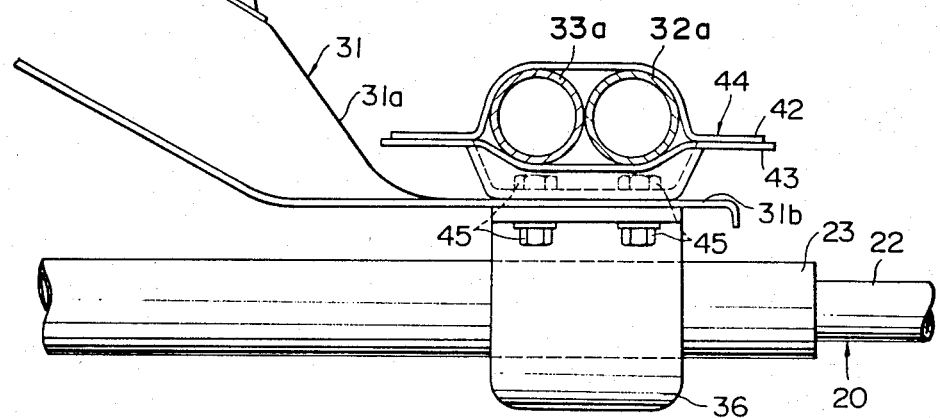
FIG. 6 is a sectional view specifically showing the column support section.
Figure 7:
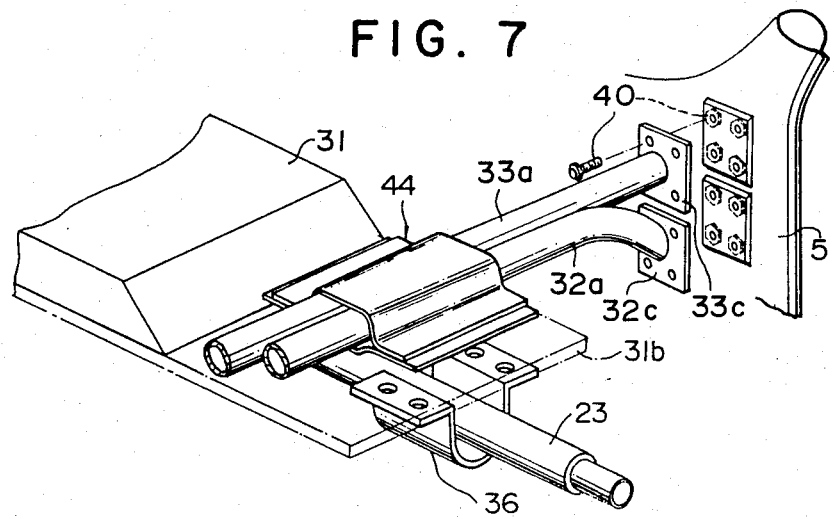
FIG. 7 is a perspective view showing the section shown in FIG. 6.

The second support member 33 is also made from a steel pipe which is bent into a substantially U-shaped configuration. The member 33 has a first portion 33a which is formed at one end with an attachment flange 33c connected to the cowl side panel 5 by means of bolts 40. The other end of the first portion 33a is continuous with a second portion 33b which extends forward and is formed at the forward end with an attachment flange 33d. The flange 33d is connected with the cowl inner panel 6 by means of bolts 41. The first portion 33a of the second support member 33 extends along and substantially parallel to the first portion 32a of the first support member 32 and is connected thereto by being held between a pair of plates 42 and 43 which together constitute a bracket assembly 44 as shown in FIGS. 6 through 8. The bracket assembly 44 is connected to the support arm 31b of the master cylinder bracket 31 on the side opposite to the fitting 36. The bracket assembly 44, the support arm 31b and the fitting 36 are connected together by bolts 45. In this manner, the steering column 23 is supported by the master cylinder bracket 31 and the support members 32 and 33 with satisfactory rigidity in either of the vertical and transverse directions.

The invention has thus been shown and described with reference to a specific embodiment. However, it should be noted that the invention is in no way limited to the details of the illustrated structures and changes and modifications may be made without departing from the scope of the appended claims.

I claim:

1. A vehicle steering column support structure including cowl side panels extending at the opposite sides of a vehicle body forwardly from door hinge pillars, a cowl inner panel extending transversely of the vehicle body and having opposite ends secured to the cowl side panels, respectively, a first support member in the form of a hollow rod, said first support member having a first portion connected at one end with one of the cowl side panels and extending along said cowl inner panel substantially to a transverse center portion of the vehicle body, said first support member having a second portion integrally formed with said first portion to extend downward from the other end of the first portion and having a lower end secured to a floor panel of the vehicle body, a second support member in the form of a hollow rod, said second support member having a first portion secured at one end to said one cowl side panel and extending along said cowl inner panel substantially to a transverse center portion of the vehicle body, said second support member having a second portion integrally formed with said first portion to extend forward from the other end of the first portion of the second support member and having a forward end secured to the cowl inner panel, the first portions of the first and second support members being arranged in substantially parallel relationship with each other, bracket means connecting said first portion of the first support member and said first portion of the second support member with a steering column assembly to support the steering column assembly by said first portions of the first and second support members, said bracket means including a first bracket member connecting together said first portion of the first support member and said first portion of the second support member, and a second bracket member connecting the steering column with said first bracket member.

2. A vehicle steering column support structure in accordance with claim 1 in which said first and second support members are made from steel pipes.

3. A vehicle steering column support structure in accordance with claim 1 which further includes second bracket means for connecting the first mentioned bracket means with the cowl inner panel, said second bracket means having a front portion connected with the cowl inner panel and a rear portion connected to at least one of said first and second bracket members.

4. A vehicle steering column support structure in accordance with claim 3 in which said first mentioned bracket means includes a first bracket member connecting together said first portion of the first support member and said first portion of the second support member, and a second bracket member connecting the steering column with said first bracket member, said second bracket means having a portion held between said first and second bracket members.

5. A vehicle steering column support structure in accordance with claim 3 in which the vehicle body includes a dash panel extending downward from said cowl inner panel, said second bracket means being connected with said dash panel to thereby support said steering column on said dash panel.

6. A vehicle steering column support structure in accordance with claim 3 in which said second bracket means is a brake master cylinder bracket for carrying a brake master cylinder.

7. A vehicle steering column support structure including cowl side panels extending at the opposite sides of a vehicle body forwardly from door hinge pillars, a cowl inner panel extending transversely of the vehicle body and having opposite ends secured to the cowl side panels, respectively, a first support member having a first portion connected at one end with one of the cowl side panels and extending along said cowl inner panel substantially to a transverse center portion of the vehicle body and a second portion integrally fromed with said first portion and extending downwardly from the other end of the first portion and having a lower end secured to a floor panel of the vehicle body, a second support member having a first portion secured at one end to said one cowl side panel and extending along said cowl inner panel substantially to a transverse center portion of the vehicle body and a second portion integrally formed with said first portion to extend forward from the other end of the first portion of the second support member and having a forward end secured to the cowl inner panel, the first portions of the first and second support members being arranged in substantially parallel relationship with each other, bracket means connecting said first portion of the first support member and said first portion of the second support member with a steering column assembly to support the steering column assembly by said first portions of the first and second support members, said bracket means including a first bracket member connecting together said first portion of the first support member and said first portion of the second support member, and a second bracket member connecting the steering column with said first bracket member, and second bracket means for connecting the first mentioned bracket means with the cowl inner panel.

8. A vehicle steering column support structure in accordance with claim 7 in which a portion of said second bracket means is held between said first and second bracket members.

9. A vehicle steering column support structure in accordance with claim 7 in which said first and second support members are in the form of hollow rods.

* * * * *